(12) United States Patent
Casale et al.

(10) Patent No.: US 10,261,391 B2
(45) Date of Patent: Apr. 16, 2019

(54) OPTOELECTRONIC DEVICE FOR GENERATION OF A COHERENT FREQUENCY COMB

(71) Applicants: Commissariat a l'energie atomique et aux energies alternatives, Paris (FR); THALES, Courbevoie (FR)

(72) Inventors: Marco Casale, Paris (FR); Houssein El Dirani, Grenoble (FR); Corrado Sciancalepore, Lyons (FR)

(73) Assignees: Commissariat A L'Energie Atomique et aux Energies Alternatives, Paris (FR); THALES, Courbevoie (FR)

( * ) Notice: Subject to any disclaimer, the term of this patent is extended or adjusted under 35 U.S.C. 154(b) by 0 days.

(21) Appl. No.: 15/862,173

(22) Filed: Jan. 4, 2018

(65) Prior Publication Data
US 2018/0196198 A1    Jul. 12, 2018

(30) Foreign Application Priority Data

Jan. 9, 2017 (FR) ...................... 17 50164

(51) Int. Cl.
*G02F 1/39* (2006.01)
*G02B 6/293* (2006.01)
(Continued)

(52) U.S. Cl.
CPC ......... *G02F 1/395* (2013.01); *G02B 6/12004* (2013.01); *G02B 6/29338* (2013.01); *G02F 1/365* (2013.01); *G02B 2006/1209* (2013.01); *G02B 2006/12109* (2013.01); *G02B 2006/12121* (2013.01); *G02F 2203/56* (2013.01)

(58) Field of Classification Search
CPC ............................ G02F 1/395; G02F 2203/56
See application file for complete search history.

(56) References Cited

U.S. PATENT DOCUMENTS

| 6,940,878 B2 * | 9/2005 | Orenstein | H01S 5/06255 372/20 |
| 8,519,803 B2 * | 8/2013 | McLaren | H01P 1/2084 333/17.1 |

(Continued)

FOREIGN PATENT DOCUMENTS

WO    WO-2018081824 A1 *  5/2018  ............... G02F 1/35

OTHER PUBLICATIONS

French Preliminary Search Report dated Oct. 12, 2017 in French Application 17 50164 filed on Jan. 9, 2017 (with English Translation of Categories of Cited Documents and Written Opinion).

(Continued)

*Primary Examiner* — Daniel Petkovsek
(74) *Attorney, Agent, or Firm* — Oblon, McClelland, Maier & Neustadt, L.L.P.

(57) ABSTRACT

The invention relates to an optoelectronic device for generation of a frequency comb comprising:
- a laser source (2);
- an optical micro-resonator (3), comprising a resonant ring (20);
- at least one waveguide (30) optically coupled to the resonant ring (20), having an effective index associated with a fundamental optical mode supported by the filtering guide (30) equal to an effective index associated with an optical higher order mode supported by the resonant ring (20).

8 Claims, 4 Drawing Sheets

(51) Int. Cl.
    *G02B 6/12*     (2006.01)
    *G02F 1/365*    (2006.01)

(56) References Cited

U.S. PATENT DOCUMENTS

| | | |
|---|---|---|
| 9,128,246 B2 * | 9/2015 | Hafezi .................... G02B 6/26 |
| 9,140,853 B2 * | 9/2015 | Varghese ........... G02B 6/12007 |
| 9,268,195 B1 * | 2/2016 | Camacho .............. G02F 1/3536 |
| 2016/0134078 A1 * | 5/2016 | Gaeta ................. H01S 3/06791 |
| | | 372/6 |
| 2018/0307118 A1 * | 10/2018 | Sciancalepore ......... G02F 1/395 |

OTHER PUBLICATIONS

Steven A. Miller et al. "Tunable frequency combs based on dual microring resonators," Optics Express 21527, 10.1364/OE.23.021527, Aug. 2015, pp. 14.

S.-W. Huang et al., "Smooth and flat phase-locked Kerr frequency comb generation by higher order mode suppression," Scientific Reports, 10.1038/srep26255, May 2016, pp. 7.

A. Kordts et al., "Higher order mode suppression in high-Q anomalous dispersion SiN microresonators for temporal dissipative Kerr soliton formation," Optics Letters, vol. 41, No. 3, Feb. 2016, pp. 4.

M.H.P. Pfeiffer et al. "Coupling Ideality of Integrated Silicon Nitride Microresonators for Nonlinear Photonics," Optical Society of America, 978-1-943580-11-8, 2016, pp. 2.

Jacob S. Levy et al. "CMOS-compatible multiple-wavelength oscillator for on-chip optical interconnects," Nature Photonics, vol. 4, 2010, pp. 4.

Yoshitomo Okawachi et al. "Octave-spanning frequency comb generation in a silicon nitride chip," Optics Letters, vol. 36, No. 17, Sep. 2011, pp. 3.

* cited by examiner

Fig.1A

Background Art

Fig.1B

Background Art

Fig.1C

Background Art

OPTOELECTRONIC DEVICE FOR GENERATION OF A COHERENT FREQUENCY COMB

TECHNICAL FIELD

The field of the invention is that of optoelectronic devices for generation of a frequency comb.

PRIOR ART

Optoelectronic devices exist that allow combs of frequencies to be generated. A frequency comb is a representation of an optical signal in the frequency domain whose spectrum is composed of a discrete sum of frequencies. The amplitude may be weighted by a spectral envelope centred on the frequency $w_p$ of a pump signal. Such optoelectronic devices are notably applicable in the field of optical telecommunications, for example coherent data transmission networks, of the generation of signals, of fast spectroscopy, or even of time-domain reference systems.

Figure 1A:
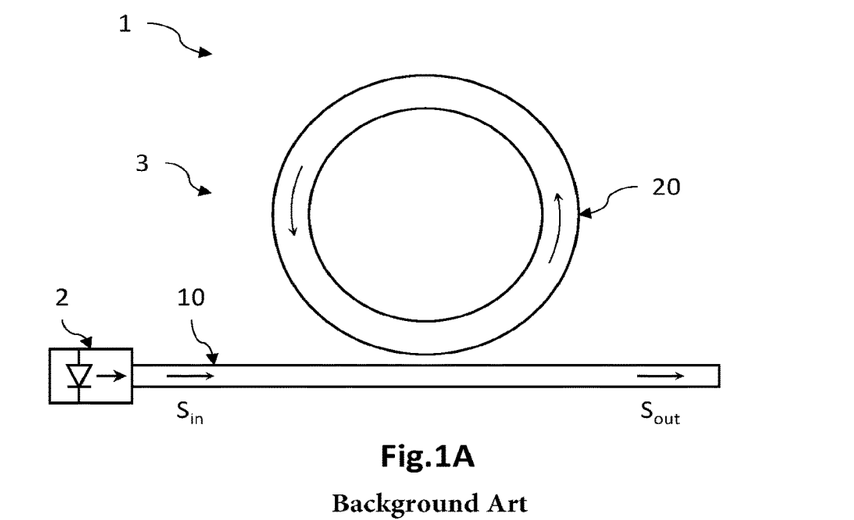
FIG. 1A is a schematic and partial top view of an optoelectronic device for generation of a frequency comb according to one example from the prior art.

FIG. 1A illustrates one example of such an optoelectronic device 1, described in the publication by Levy et al. entitled *CMOS-compatible multiple-wavelength oscillator for on-chip optical interconnects*, Nature Photon. 4, 37-40 (2010), this optoelectronic device 1 being fabricated by microelectronics processes of the CMOS type. It comprises a laser source 2 and an optical ring micro-resonator 3. The laser source 2 is designed to emit an optical signal $S_{in}$ known as a pump signal, continuous and monochromatic of wavelength $\lambda_p$. The micro-resonator 3 comprises a first waveguide 10 having an input coupled to the laser source 2 and an output which supplies an optical signal $S_{out}$ whose spectrum forms the frequency comb generated. It furthermore comprises an optical cavity formed from a second waveguide 20, known as a resonant ring, made from a material with non-linear optical properties of the third order, here silicon nitride.

Figure 1B:
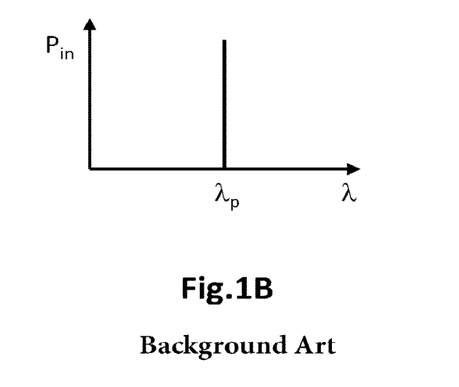
FIGS. 1B and 1C respectively illustrate one example of a spectrum in wavelength of the optical pump signal and one example of the frequency comb generated.
Figure 1C:
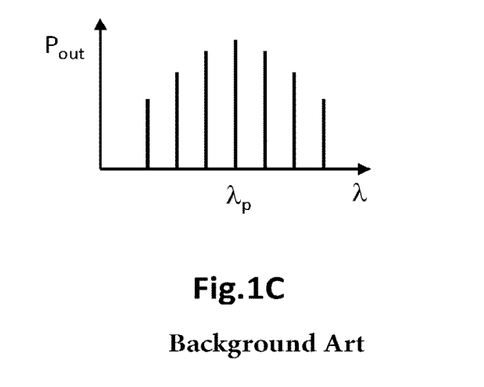

The optical micro-resonator 2 forms an optical parametric oscillator. The pump signal $S_{in}$, whose spectrum is shown in FIG. 1B, couples in a resonant manner via evanescent wave to a fundamental mode of the resonant ring 20. Given that the material of the resonant ring 20 is optically non-linear of order three, in other words it has an electrical susceptibility of order three, a phenomenon referred to as cascaded four-wave mixing occurs which, starting from the fundamental mode supported by the resonant ring 20, generates a frequency comb one example of which is shown in FIG. 1C. Furthermore, given that such an optical micro-resonator exhibits a high quality factor Q, it is not necessary for the power of the pump signal to be high for the parametric gain to be higher than the optical losses present in the resonant ring, which allows the amplification of the waves generated to be initiated.

The publication by Kordts et al. entitled *Higher order mode suppression in high-Q anomalous dispersion SiN microresonators for temporal dissipative Kerr soliton formation*, Opt. Lett. 41, 452 (2016), describes another example of an optoelectronic device here allowing a coherent frequency comb to be generated, in which the resonant ring made of SiN exhibits an anomalous dispersion regime at the pump wavelength $\lambda_p$. Owing to the anomalous dispersion and to the non-linear properties of the third order of the material of the resonant ring, time-domain dissipative solitons, known as Kerr solitons, are formed, which generate a frequency comb by cascaded four-wave mixing. The optoelectronic device notably allows a frequency comb to be generated whose amplitude and frequency noise is reduced.

However, as Kordts 2016 explains, the dimensioning of such a resonant ring with the aim of obtaining an anomalous dispersion regime corresponds to making the resonant ring multimode. However, it turns out that the various modes supported by the resonant ring can interfere with one another, which may degrade the anomalous regime of the dispersion and thus disrupt the formation of the Kerr time-domain solitons. One solution then consists in locally modifying the resonant ring in order to form a portion that is locally single-mode, adapted to filtering the higher order modes.

DESCRIPTION OF THE INVENTION

The aim of the invention is to overcome, at least in part, the drawbacks of the prior art and, more particularly, to provide an optoelectronic device for generation of a higher-performance coherent frequency comb. Another purpose of the invention is to provide an optoelectronic device for generation of a coherent frequency comb whose optical losses are limited. Yet another purpose is to provide an optoelectronic device which limits, or even eliminates, the optical interference likely to degrade the formation of the Kerr time-domain dissipative solitons. For this purpose, the subject of the invention is an optoelectronic device for generation of a frequency comb comprising a laser source designed to emit an optical signal, referred to as pump signal, that is continuous and monochromatic with a wavelength referred to as pump wavelength, and an optical ring micro-resonator.

The optical micro-resonator comprises:
  a first waveguide, comprising an input optically coupled to the laser source, and an output intended to supply the frequency comb generated;
  a second ring multimode waveguide, referred to as resonant ring, optically coupled to the first waveguide so as to generate an optical mode called fundamental mode in the resonant ring, the resonant ring being formed from a material, referred to as core material, optically non-linear of order three whose index of refraction depends on the intensity of an optical signal passing through it and which has transverse dimensions such that it exhibits an anomalous dispersion regime associated with said fundamental optical mode. In other words, the transverse dimensions of the resonant ring, for example the width and/or the thickness of the resonant ring, are chosen such that the dispersion parameter D, at the wavelength of the fundamental mode, is positive.

According to the invention, the optoelectronic device furthermore comprises at least a third waveguide, referred to as filtering guide, optically coupled to the resonant ring, having an effective index associated with a fundamental optical mode supported by the filtering guide equal to an effective index associated with an optical higher order mode supported by the resonant ring.

Some preferred, but non-limiting, aspects of this optoelectronic device are the following.

The filtering guide may comprise a coupling portion optically coupled to the resonant ring, and formed from a material, referred to as core material, the index of refraction of the core material and transverse dimensions being chosen such that an associated effective index of the fundamental optical mode of the filtering guide is equal to an effective index associated with the optical higher order mode of the resonant ring.

The filtering guide may have a single-mode coupling portion.

The filtering guide may be made from a material, referred to as core material, identical to that of the resonant ring.

The filtering guide may comprise a coupling portion spaced from the resonant ring by a distance in the range between 200 nm and 300 nm.

The filtering guide may comprise a coupling portion and an end portion, the end portion having transverse dimensions that decrease with increasing distance from the coupling portion.

The resonant ring may be composed of a core surrounded by a cladding, the core material being silicon nitride.

The resonant ring may have an average thickness greater than or equal to 700 nm, and an average width greater than or equal to 1200 nm.

BRIEF DESCRIPTION OF THE DRAWINGS

Other aspects, aims, advantages and features of the invention will become more clearly apparent upon reading the following detailed description of preferred embodiments of the latter, given by way of non-limiting example, and presented with reference to the appended drawings, aside from FIGS. 1A-1C, already described, in which.

DETAILED DESCRIPTION OF PARTICULAR EMBODIMENTS

In the figures and in the following part of the description, the same references represent identical or similar elements. Moreover, the various elements are not shown to scale in order to enhance the clarity of the figures. Furthermore, the various embodiments and variants are not exclusive of one another and may be combined with one another. Unless otherwise indicated, the terms "substantially", "around", "of the order of" mean to within 10%.

The invention relates to an optoelectronic device for generation of a coherent frequency comb. It comprises an optical micro-resonator which forms an optical parametric oscillator, in which a coherent frequency comb is generated by a non-linear phenomenon of order three of cascaded four-wave mixing, associated with the formation of time-domain dissipative solitons of the Kerr type. The frequency comb is said to be coherent when all or part of the frequency lines have a phase relationship with one another. The coherence of the frequency comb here is linked to the presence of time-domain dissipative solitons of the Kerr type.

An optical parametric oscillator is a source of coherent light which is based on a parametric amplification in an optical resonator. The optical resonator here comprises an optical cavity formed in a non-linear medium of the third order, in other words comprising an electrical susceptibility $\chi^{(3)}$ of order three, allowing the cascaded four-wave mixing to take place, thus generating a frequency comb.

Cascaded four-wave mixing is a non-linear phenomenon of the third order in which two photons of the pump frequency $w_p$ are converted, without energy loss, into a signal photon of frequency $w_s$ and a idler photon of frequency $w_c$. It is said to be cascaded given that the photons generated also cause the generation of other signal and idler photons by four-wave mixing.

The optical Kerr effect is a non-linear phenomenon of order three which expresses the dependence of the index of refraction of a medium with respect to the intensity of the optical signal passing through it. This dependence may be formalized by the relationship: $n=n_0+n_2 \cdot I$, where n is the index of refraction of the material, $n_0=(1+\chi^{(1)})^{1/2}$, where $\chi^{(1)}$ is the electrical permittivity of order 1, $n_2$ is the non-linear index which depends on the electrical permittivity $\chi^{(3)}$ of order 3, and where I is the intensity of the optical signal passing through the medium.

As detailed hereinbelow, in order to allow the formation of the time-domain dissipative Kerr solitons, the optical cavity of the micro-resonator is furthermore designed to exhibit an anomalous dispersion regime associated with the fundamental optical mode that it supports. The dispersion is said to be anomalous when the dispersion parameter D is positive. This parameter D, expressed in ps/(nm·km), is defined as the product of a quantity $\beta_2$ and $-2\pi c/\lambda^2$ where $\lambda$ is the wavelength of the fundamental mode supported by the resonant ring, here equal to the pump wavelength $\lambda_p$. The quantity $\beta_2$, also known as the Group Velocity Dispersion (or GVD), corresponds to the fact that the group velocity of the optical signal is dependent on the wavelength of the signal. The quantity $\beta_2$ is defined as being equal to the derivative of the inverse of the group velocity of the optical signal:

$$\beta_2 = \frac{\partial}{\partial w} \frac{1}{v_g} = \frac{\partial^2 k}{\partial w^2},$$

where $v_g$ is the group velocity of the optical signal in question, w the frequency and k the wave number. In other words, it corresponds to the second derivative of $\beta(w)$ with respect to w, at the pump wavelength $\lambda_p$. $\beta$ is the propagation constant, which depends on the optical field of the mode and on the dimensional characteristics of the waveguide.

Figure 2A:
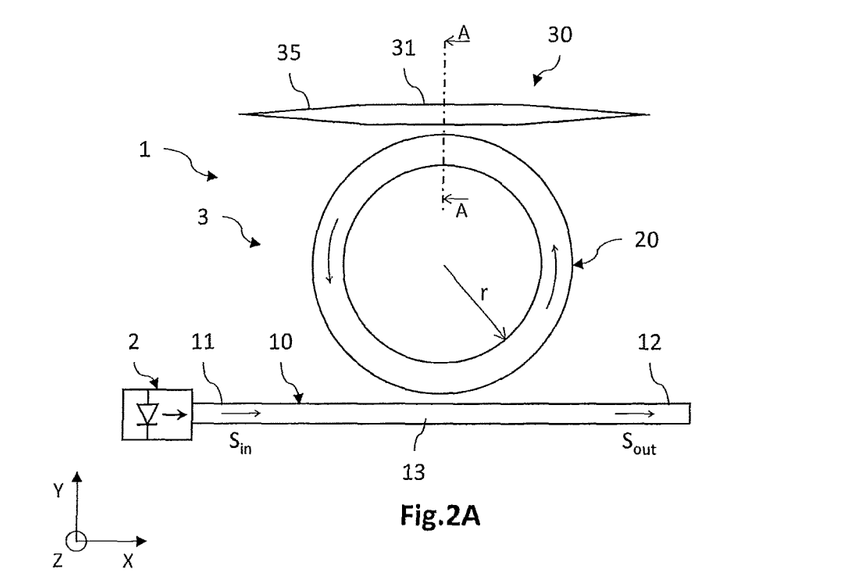
FIG. 2A is a schematic and partial top view of an optoelectronic device for generation of a frequency comb according to one embodiment.
Figure 2B:
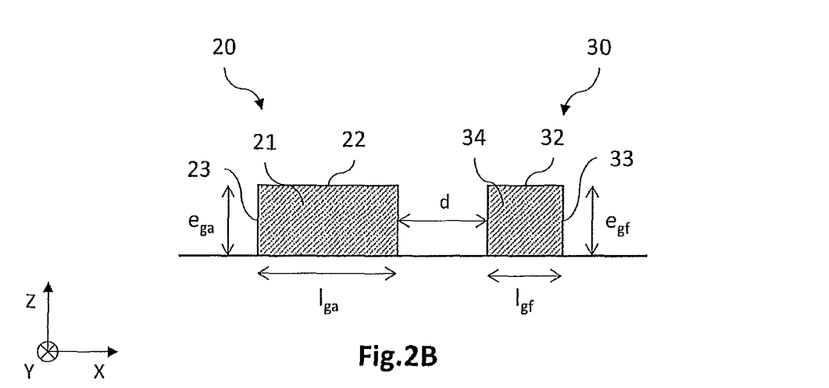
FIG. 2B is a transverse cross-sectional view of the resonant ring and of the filtering guide through a plane A-A.

FIG. 2A is a schematic and partial top view of an optoelectronic device 1 for generation of a coherent frequency comb according to one embodiment. This optoelectronic device 1 comprises a laser source 2 designed to emit a monochromatic and continuous optical signal, an optical ring micro-resonator 3, and at least one filtering waveguide 30. FIG. 2B is a cross-sectional view of the resonant ring 20 and of the filtering guide 30 through a plane AA illustrated in FIG. 2A.

In the following part of the description, a three-dimensional orthogonal reference frame (X,Y,Z) is defined where the axes X and Y form a plane parallel to the plane on which the waveguides of the optoelectronic device rest, and where the axis Z is oriented along the thickness dimension of the waveguides.

The laser source 2 is designed to emit an optical signal $S_{in}$ referred to as a pump signal. This optical signal is continuous and monochromatic with a wavelength $\lambda_p$. The pump wavelength $\lambda_p$ is chosen so as to be capable of exciting a fundamental mode supported by a ring waveguide 20 of the optical micro-resonator 3. By way of example, it may be equal to 1.55 µm in the case of a "telecoms" application, or equal to 1.31 µm for a "datacoms" application, or may even also be a wavelength in the visible or in the infrared, in particular the mid-infrared. The power of the pump signal is chosen in such a manner as to be higher than the optical losses present in the optical micro-resonator, such that the parametric gain is higher than the optical losses and that the amplification of the optical signal in the ring micro-resonator 3 can generate a frequency comb by cascaded four-wave mixing.

The optical ring micro-resonator 3 comprises a first waveguide 10 and a second ring waveguide 20, referred to as resonant ring.

The first waveguide 10 comprises an input 11 and an output 12, which also form the input and the output of the optical micro-resonator 3. The input 11 is optically coupled to the laser source 2 for receiving the pump signal $S_{in}$ emitted by the latter, and the output 12 is intended to supply the frequency comb generated. It comprises a coupling region 13 designed to be optically coupled, via evanescent wave, to the resonant ring 20.

The first waveguide 10 is made of a material, referred to as core material, with a high index of refraction. More precisely it comprises a core composed of the high refractive index material surrounded by a cladding formed from at least one material with a low index of refraction. The core rests on the surface of a substrate (not shown) whose material participates in forming the cladding. By way of example, the core material may be a silicon nitride SiN, for example $Si_3N_4$, and the cladding material may be a silicon oxide SiO, for example $SiO_2$.

The waveguide 10 extends longitudinally between the input 11 and the output 12, and may be of any given shape. More generally speaking, each waveguide has an upper face opposite to the surface of the substrate, and sidewalls which extend from the upper face down to the surface of the substrate. It has transverse dimensions of height and of width. 'Height' is understood to mean the average distance between the upper face of the waveguide, and more precisely of the core, and the surface of the substrate, along the axis Z orthogonal to the plane of the substrate. 'Width' is understood to mean the average distance between the sidewalls of the waveguide, and more precisely of the core, in a plane parallel to the plane of the substrate. The height and the width are substantially constant along the longitudinal extent of the waveguide. By way of example, for a pump wavelength of 1.55 µm, the transverse dimensions of the core may go from a few hundred nanometers up to several micrometers. The first waveguide may be single-mode or multimode. In this example, it is preferably single-mode and supports a TE mode (transverse electric).

The second waveguide 20, referred to as resonant ring, forms the optical cavity of the micro-resonator 3. As for any optical parametric oscillator of the Kerr type, it comprises a non-linear material of order three allowing optical waves of wavelength different from the pump wavelength to be generated by a cascaded four-wave mixing phenomenon. In addition, the resonant ring 20 exhibits an anomalous dispersion regime for the fundamental optical mode, thus allowing the formation of time-domain dissipative solitons of the Kerr type contributing, with the cascaded four-wave mixing, to the generation of the coherent frequency comb.

The resonant ring 20 is a waveguide in the shape of a ring. It comprises an optical coupling region allowing it to be coupled via evanescent wave to the first waveguide. It may take the form of a circle, of an oval or of another shape. In this example, it takes the form of a circle whose radius r is defined from a longitudinal line running along the transverse barycentre of the core of the resonant ring 20.

The resonant ring 20 is formed from a high index material with non-linear optical properties of order three. More precisely, it comprises a core 21 formed from the high refractive index material and a cladding formed from a low refractive index material. The core 21 has an upper face 22 opposite to the surface of the substrate on which it rests, and sidewalls 23 which extend from the upper face 22 down to the substrate. It has a thickness $e_{ga}$ and a width $l_{ga}$ that are substantially constant along its longitudinal extent.

The resonant ring 20 is designed to be optically coupled to the first waveguide 10. Thus, it is dimensioned so that there is phase matching between the fundamental optical mode, here $TE_{00}$, supported by the first guide 10 and the fundamental optical mode, here $TE_{00}$, supported by the resonant ring 20. In other words, the propagation constant of the fundamental mode $TE_{00}$ supported by the resonant ring 20 is equal to the propagation constant of the fundamental mode $TE_{00}$ supported by the first guide 10, which here corresponds to the equality between the effective index of the fundamental mode $TE_{00}$ supported by the resonant ring 20 and that of the fundamental mode $TE_{00}$ supported by the first guide 10.

Generally speaking, the effective index $n_{eff}$ of a mode of a waveguide is defined as the product of the propagation constant $\beta$ and $\lambda/2\pi$. The propagation constant $\beta$ depends on the wavelength $\lambda$ and on the mode of the optical signal, and also on the properties of the waveguide (refractive indices and geometry). The effective index of the mode corresponds, in a way, to the index of refraction of the guide 'seen' by the optical mode. It is usually in the range between the index of the core and the index of the cladding of the waveguide.

The resonant ring 20 is furthermore designed to provide a parametric conversion of frequencies by cascaded four-wave mixing. For this purpose, the high index material of the core exhibits non-linear optical properties allowing the optical Kerr effect, and thus exhibits an index of refraction which depends on the intensity of the optical signal passing through it. Four-wave mixing by optical Kerr effect is then possible. Preferably, the material of the resonant ring, and more precisely that of the core 21, is a silicon nitride SiN, for example of the $Si_3N_4$. The cladding material may be a silicon oxide SiO, for example $SiO_2$.

The resonant ring 20 is moreover adapted to form time-domain dissipative solitons, known as Kerr solitons. By definition, a soliton is a solitary optical wave which propagates without being deformed in a non-linear and dissipative medium. These solitons are said to be of the Kerr type given that they are generated in a non-linear material of the third order by optical Kerr effect.

Given that the solitonic regime can only occur in an optical cavity where the dispersion is anomalous, the resonant ring 20 is designed such that the dispersion is anomalous for the fundamental mode, here $Te_{00}$, supported by the resonant ring 20. For this purpose, as shown in the publication by Okawachi et al. entitled *Octave-spanning frequency comb generation in a silicon nitride chip*, Opt. Lett. 36, 3398 (2011), the transverse dimensions of height and/or of width of the resonant ring 20, and more precisely of the core 21 of the resonant ring 20, are designed such that it exhibits an anomalous dispersion regime associated with the fundamental mode, here $Te_{00}$. In the case where the core material is a silicon nitride, this then leads to the fact that the dimensions of thickness and/or of width of the resonant ring 20 become greater than the wavelength $\lambda_p$ of the pump signal, the resonant ring 20 then being able to support several different optical modes (multimode guide). The resonant ring 20 can thus support the fundamental mode $TE_{00}$ and at least one higher order mode, for example the mode $TE_{01}$. By way of example, in the case of a pump wavelength $\lambda_p$ equal to around 1.55 μm, and for a material of the core of the resonant ring of silicon nitride, the height $e_{ga}$ is preferably greater than or equal to 700 nm and the width $I_{ga}$ is preferably greater than or equal to 1200 nm.

The filtering guide 30 is optically coupled to the resonant ring 20 in such a manner as to filter a higher order mode, here for example the mode $TE_{01}$, supported by the resonant ring 20. It thus allows the interactions between the various optical modes within the resonant ring 20 to be limited, these interactions being likely to degrade the anomalous regime of the dispersion D and hence to interfere with the formation of the time-domain dissipative solitons.

For this purpose, the filtering guide 30 comprises a coupling portion 31 optically coupled to the resonant ring 20. The dimensions and the refractive index of the filtering guide 30, more precisely of the core 34 of the filtering guide 30, are chosen such that there is phase matching between the optical higher order mode to be filtered, here $TE_{01}$, supported by the resonant ring 20, and the fundamental optical mode $TE_{00}$ supported by the filtering guide 30. In other words, the propagation constant of the higher order mode to be filtered $TE_{01}$ supported by the resonant ring 20 is equal to the propagation constant of the fundamental mode $TE_{00}$ supported by the filtering guide 30, which here corresponds to the equality between the effective index of the higher order mode $TE_{01}$ of the resonant ring 20 with that of the fundamental mode $TE_{00}$ of the filtering guide 30. Thus, the filtering guide 30 is able to filter the higher order mode of the resonant ring 20. Moreover, given that there is phase matching between these two optical modes, there is no phase matching between the filtering guide 30 and the fundamental mode $TE_{00}$ of the resonant ring 20, such that the presence of the filtering guide 30 does not substantially lead to interference on the fundamental mode of the resonant ring 20.

The filtering guide 30 is composed of a core 34 made from at least one material of high index surrounded by a cladding made from at least one material of low index. The material of high index is preferably identical to that of the resonant ring 20, for example a silicon nitride SiN, for example of the $Si_3N_4$. The cladding material may be a silicon oxide SiO, for example of the $SiO_2$. The filtering guide 30 has a constant thickness $e_{gf}$ and a constant width $I_{gf}$ within the coupling portion 31. The filtering guide 30 is spaced from the resonant ring 20 by a distance d, corresponding to the minimum distance separating the coupling portion of the filtering guide 30 from the resonant ring 20. The distance d is measured from the sidewalls facing the resonant ring 20 and of the filtering guide 30. The distance d may be of the order of a few hundred nanometers, or even a few microns. It may thus be in the range between 100 nm and 800 nm, preferably in the range between 100 nm and 400 nm, and more preferably in the range between 200 nm and 300 nm, for example equal to around 250 nm.

The waveguide 30 comprises a portion, referred to as end portion 35, situated in the extension of the coupling portion 31 in the direction of the propagation of the fundamental optical mode, which has a progressive decrease in its transverse dimensions, and here in its width, with distance from the coupling portion 31. A progressive decrease in the effective index of the guided mode is thus achieved, resulting in an optical leak of the mode by diffractive radiation into the substrate.

The operation of the optoelectronic device according to the embodiment is now described, with reference to FIGS. 3A-3B and 4A-4B.

Figure 3A:
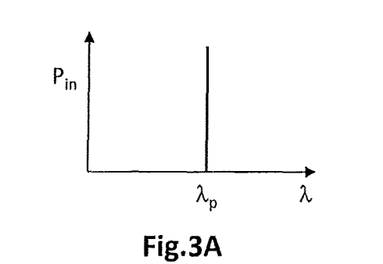
FIGS. 3A and 3B respectively illustrate one example of a spectrum in wavelength of the optical pump signal and one example of a frequency comb generated by the optoelectronic device shown in FIG. 2A.

The laser source 2 emits a continuous and monochromatic optical pump signal $S_{in}$ with a wavelength $\lambda_p$, one spectrum of which is illustrated in FIG. 3A. This pump signal $S_{in}$ is transmitted by the first waveguide 10 in the direction of the output 12 of the guide. Given that the first waveguide 10 is single-mode in this example, the pump signal corresponds to a fundamental mode of the guide 10, for example $TE_{00}$.

Via optical coupling of the evanescent type between the first waveguide 10 and the resonant ring 20, the $TE_{00}$ mode pump signal $S_{in}$ excites the fundamental mode $TE_{00}$ of the resonant ring 20. More precisely, the optical coupling is carried out by phase matching between the fundamental mode $TE_{00}$ of the first guide 10 and the fundamental mode $TE_{00}$ of the resonant ring 20. Thus, a part or the entirety of the optical signal $S_{in}$ is transmitted from the first guide 10 into the resonant ring 20.

Figure 3B:
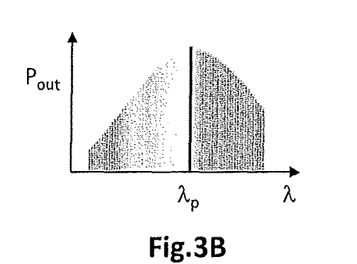

Given that the resonant ring 20 is made from a non-linear material of the third order enabling the optical Kerr effect, on the one hand, and that it has an anomalous dispersion regime, on the other, time-domain dissipative Kerr solitons are formed which generate a coherent frequency comb by cascaded four-wave mixing.

The generation of the coherent frequency comb is made more robust given that the formation of the dissipative solitons is not affected by potential coupling or interference effects between the fundamental mode $TE_{00}$ and at least one optical higher order mode, here the mode $TE_{01}$.

Figure 4A:
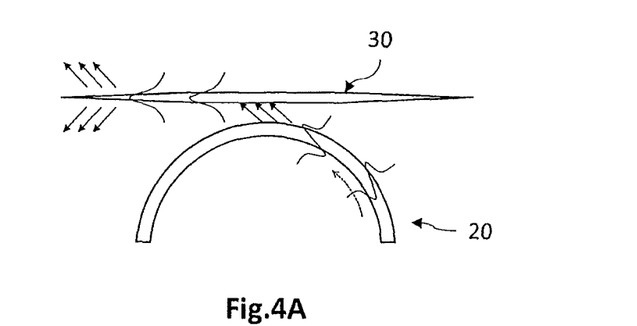
FIGS. 4A and 4B are schematic and partial top views of the resonant ring and of the filtering guide, illustrating the filtering of the higher order mode supported by the resonant ring by the filtering guide (FIG. 4A) and the absence of filtering of the fundamental mode supported by the resonant ring (FIG. 4B)

Indeed, as illustrated in FIG. 4A, the optical higher order mode $TE_{01}$ supported by the resonant ring 20 is filtered and hence substantially removed from the resonant ring 20 by the optical coupling between the resonant ring 20 and the filtering guide 30. This optical filtering is obtained by the phase matching between the higher order mode, here $TE_{01}$, of the resonant ring 20 and the fundamental mode $TE_{00}$ of the filtering guide 30. Thus, the optical power of the mode $TE_{01}$ present in the resonant ring 20 is transmitted to the fundamental mode $TE_{00}$ of the filtering guide 30.

Figure 4B:
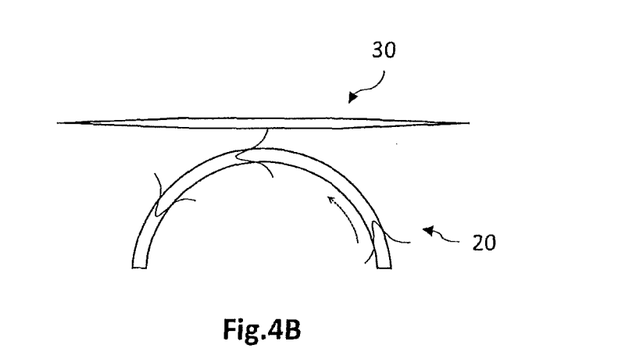

Moreover, as illustrated in FIG. 4B, the filtering of the higher order mode $TE_{01}$ does not impact the fundamental mode $TE_{00}$ (nor its dispersion) of the resonant ring 20, given that there is no phase matching between the fundamental mode $TE_{00}$ of the resonant ring 20 and that of the filtering guide 30.

Thus, at the output of the first waveguide, a coherent frequency comb is obtained. It exhibits a constant free spectral interval, in other words a constant value of spacing between the successive frequency lines, together with a low frequency and/or amplitude noise. In addition, the amplitude of the frequency lines is weighted by a spectral envelope of the hyperbolic sine squared ($\sinh^2$) type centred on the pump wavelength $\lambda_p$, thus corresponding to the coherence of the frequency comb.

The optoelectronic device 1 thus has reduced optical losses with respect to the example of the prior art previously mentioned, given that the resonant ring 20 does not comprises a filtering portion. The optical micro-resonator 3 thus exhibits a decreased oscillation threshold, in the sense of an optical parametric oscillator, allowing a frequency comb of the same intensity for a reduced power of the pump signal, or a frequency comb of higher intensity for an identical power of the pump signal.

Moreover, the optoelectronic device is rendered more robust given that the dispersion regime remains of the anomalous type over the whole length of the resonant ring 20, thus limiting the interference likely to degrade the formation of the time-domain dissipative solitons of the Kerr type.

Purely by way of illustration, the optoelectronic device 1 may comprise a laser source 2 designed to emit a monochromatic continuous optical pump signal, with a wavelength equal to 1.55 µm. The pump signal is guided in the first waveguide 10, the latter being single-mode and supporting the fundamental mode $TE_{00}$.

The resonant ring 20 is made of $Si_3N_4$ which is a material exhibiting the optical Kerr effect. It has a radius r of around 115 µm, a thickness $e_{ga}$ of around 710 nm and a width $I_{ga}$ of around 1.6 µm. The resonant ring 20 is therefore multimode at 1.55 µm and supports the fundamental mode $TE_{00}$, together with at least one higher order mode, for example the mode $TE_{01}$. Irrespective of the filtering guide 30, the resonant ring 20 has a chromatic dispersion parameter D associated with the fundamental mode $TE_{00}$ at 1.55 µm equal to 82.2 ps/(nm·km). Since this value of chromatic dispersion is positive, the resonant ring 20 is indeed in an anomalous dispersion regime for this optical signal.

Furthermore, the filtering guide 30 is also made of $Si_3N_4$. It has a coupling portion with a thickness $e_{gf}$ of around 710 nm, substantially equal to that of the resonant ring 20, and with a width $I_{gf}$ of around 660 nm. Aside from the index of refraction of the filtering guide 30, the transverse dimensions of its coupling portion 31 are chosen such that there is phase matching between the higher order mode $TE_{01}$ supported by the resonant ring 20 and the fundamental mode $TE_{00}$ supported by the filtering guide 30. In other words, the effective index of the higher order mode $TE_{01}$ supported by the resonant ring 20 is substantially equal to the effective index of the fundamental mode $TE_{00}$ supported by the filtering guide 30: $(n_{eff,TE01})_{ga}=(n_{eff,TE00})_{gf}$.

Figure 5A:
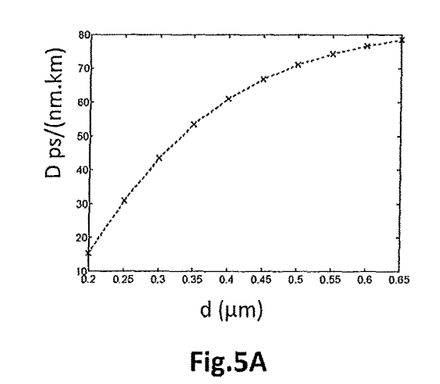
FIGS. 5A-5C illustrate one example of influence of the distance d separating the filtering guide from the resonant ring on the value of the dispersion parameter D (FIG. 5A); on the optical coupling for the higher order mode supported by the resonant ring and filtered by the filtering guide (FIG. 5B); on the optical losses of the fundamental mode supported by the resonant ring (FIG. 5C)

As illustrated in FIG. 5A, it can be seen that the value of the dispersion parameter D associated with the fundamental mode $TE_{00}$ supported by the resonant ring 20 at the pump wavelength of 1.55 µm is modified by the presence of the filtering guide 30, and that it is notably a function of the distance d separating the filtering guide 30 from the resonant ring 20. Thus, the value of the parameter D decreases as the filtering guide 30 is brought closer to the resonant ring 20. It is thus 78 ps/(nm·km) at a distance d of 650 nm and continuously decreases to a value of 15 ps/(nm·km) at a distance d of 200 nm. Thus, whatever the value of the distance d between the filtering guide 30 and the resonant ring 20, the value of the dispersion parameter D remains positive, thus corresponding to the presence of an anomalous dispersion regime for the fundamental mode $TE_{00}$ supported by the resonant ring at the pump wavelength of 1.55 µm.

Figure 5B:
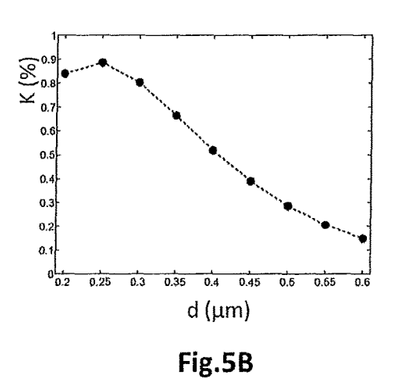

As illustrated in FIG. 5B, the coupling factor K via evanescent wave between the higher order mode $TE_{01}$ supported by the resonant ring 20 and the mode $TE_{00}$ supported by the filtering guide 30 depends on the distance d separating the filtering guide 30 from the resonant ring 20. Although the coupling factor K decreases as the distance d increases, it turns out that it has an optimum at around 250 nm, where the coupling factor is equal to around 90%. Thus, the distance d is preferably less than or equal to around 400 nm in order to ensure a coupling factor greater than or equal to 50%, and is preferably less than or equal to 350 nm, and preferably in the range between 200 nm and 300 nm for ensure a coupling factor greater than or equal to 80%, and more preferably equal to around 250 nm.

Figure 5C:
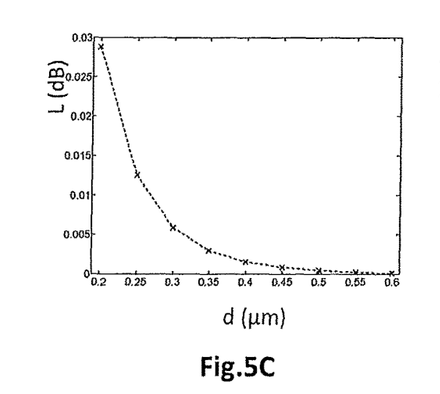

As illustrated in FIG. 5C, the optical losses L of the fundamental mode $TE_{01}$ supported by the resonant ring 20, owing to the presence of the filtering guide 30, remain very low, thus resulting in the low impact of the filtering guide 30 on this optical mode. The filtering guide 30 then allows the higher order mode $TE_{01}$, present in the resonant ring 20, to be correctly filtered without affecting the fundamental mode $TE_{00}$. The optical losses decrease as the distance d increases, but they remain very low. They are thus lower than 0.03 dB for a distance d greater than 200 nm and fall to around 0.01 dB for a distance d of 250 nm. They are therefore negligible, or even virtually zero.

Figure 5D:
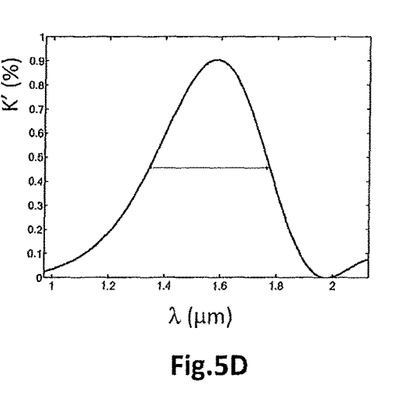
FIG. 5D illustrates the variation of the optical coupling for the higher order mode supported by the resonant ring and filtered by the filtering guide as a function of wavelength for a fixed distance d.

FIG. 5D illustrates the coupling factor K' between the higher order mode $TE_{01}$ supported by the resonant ring 20 and the mode $TE_{00}$ supported by the filtering guide 30 as a function of wavelength, for a distance d equal to around 250 nm. In other words, this figure illustrates the spectral behaviour of the filtering guide 30 between the resonant ring 20 and the filtering guide 30 at a distance d of around 250 nm. The coupling factor K' has a maximum value of 90% for a wavelength of around 1.585 µm. The bandwidth e of the filter, at 3 dB, is equal to around 430 nm. Such a filtering guide 30 thus allows the constraints for phase matching between the optical modes of the resonant ring 20 and of the filtering guide 30 to be limited.

Particular embodiments have just been described. Various variants and modifications will be apparent to those skilled in the art. Thus, the aforementioned higher order mode to be filtered is the mode $TE_{01}$, but this could be the mode $TE_{10}$ or even another type of mode. If several modes of higher order are present in the resonant ring 20, several filtering guides may be provided, which are each designed to filter a given higher order mode. Furthermore, the aforementioned examples of optical modes are TE (transverse electric) modes, but these could also be TM (transverse magnetic) modes.

The invention claimed is:
1. An optoelectronic device for generation of a frequency comb, comprising:
 a laser source configured to emit an optical pump signal that is continuous and monochromatic at a pump wavelength;

an optical ring micro-resonator, comprising:
- a first waveguide, comprising an input optically coupled to the laser source, and an output intended to supply the frequency comb generated;
- a second waveguide, which is a ring multimode waveguide referred to as a resonant ring, optically coupled to the first waveguide for generating a fundamental optical mode in the resonant ring, the resonant ring being formed from a core material optically non-linear of order three whose index of refraction depends on the intensity of an optical signal passing through the resonant ring, and which has transverse dimensions such that the resonant ring exhibits an anomalous dispersion regime associated with said fundamental optical mode; and
- at least a third waveguide, referred to as a filtering guide, optically coupled to the resonant ring, having an effective index associated with a fundamental optical mode supported by the filtering guide equal to an effective index associated with an optical higher order mode supported by the resonant ring.

2. The optoelectronic device according to claim 1, wherein the filtering guide comprises a coupling portion optically coupled to the resonant ring and formed from a core material, the index of refraction of the core material and transverse dimensions being chosen such that an effective index associated with the fundamental optical mode of the filtering guide is equal to an effective index associated with the optical higher order mode of the resonant ring.

3. The optoelectronic device according to claim 1, wherein the filtering guide has a single-mode coupling portion.

4. The optoelectronic device according to claim 1, wherein the filtering guide is made from a core material identical to that of the resonant ring.

5. The optoelectronic device according to claim 1, wherein the filtering guide comprises a coupling portion spaced from the resonant ring by a distance in the range between 200 nm and 300 nm.

6. The optoelectronic device according to claim 1, wherein the filtering guide comprises a coupling portion and an end portion, the end portion having transverse dimensions which decrease with distance from the coupling portion.

7. The optoelectronic device according to claim 1, wherein the resonant ring is composed of a core surrounded by a cladding, the core material being silicon nitride.

8. The optoelectronic device according to claim 1, wherein the resonant ring has an average thickness greater than or equal to 700 nm, and an average width greater than or equal to 1200 nm.

* * * * *